United States Patent
Tomoda et al.

(10) Patent No.: US 8,302,382 B2
(45) Date of Patent: Nov. 6, 2012

(54) EXHAUST GAS PURIFICATION SYSTEM FOR INTERNAL COMBUSTION ENGINE AND CONTROL METHOD FOR SAME

(75) Inventors: Terutoshi Tomoda, Mishima (JP);
Shinobu Ishiyama, Numazu (JP);
Michio Furuhashi, Numazu (JP);
Tomoyuki Ono, Shizuoka-ken (JP);
Koichiro Nakatani, Mishima (JP);
Tomoyuki Kogo, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 521 days.

(21) Appl. No.: 12/529,267

(22) PCT Filed: Feb. 29, 2008

(86) PCT No.: PCT/IB2008/000458
§ 371 (c)(1),
(2), (4) Date: Sep. 18, 2009

(87) PCT Pub. No.: WO2008/104864
PCT Pub. Date: Sep. 4, 2008

(65) Prior Publication Data
US 2010/0095651 A1      Apr. 22, 2010

(30) Foreign Application Priority Data
Mar. 1, 2007 (JP) .................. 2007-051114

(51) Int. Cl.
*F01N 3/20* (2006.01)
(52) U.S. Cl. .............. 60/285; 60/278; 60/295
(58) Field of Classification Search .......... 60/285, 60/286, 295, 301, 303
See application file for complete search history.

(56) References Cited

U.S. PATENT DOCUMENTS

| | | | | |
|---|---|---|---|---|
| 5,850,816 A | * | 12/1998 | Ohsuga et al. | 123/430 |
| 5,910,097 A | | 6/1999 | Boegner et al. | |
| 2004/0163383 A1 | | 8/2004 | Khair et al. | |
| 2006/0241848 A1 | * | 10/2006 | Strom et al. | 701/105 |

FOREIGN PATENT DOCUMENTS

| | | |
|---|---|---|
| EP | 0 764 771 A2 | 3/1997 |
| EP | 0 957 254 A2 | 11/1999 |
| EP | 1 475 521 A1 | 11/2004 |
| JP | 2000-008835 A | 1/2000 |
| JP | 2001-234772 A | 8/2001 |
| JP | 2005-069207 A | 3/2005 |
| JP | 2005-163696 A | 6/2005 |
| JP | 2006-112348 A | 4/2006 |
| JP | 2006-291821 A | 10/2006 |
| JP | 2007-040241 A | 2/2007 |
| JP | 2007-162501 A | 6/2007 |

\* cited by examiner

*Primary Examiner* — Thomas Denion
*Assistant Examiner* — Jonathan Matthias
(74) *Attorney, Agent, or Firm* — Sughrue Mion, PLLC

(57) ABSTRACT

During a rich spike control for an exhaust gas purification system for an internal combustion engine, a base air-fuel ratio AFb is decreased in a range where a combustion variation ΔCC does not exceed a permissible limit ΔCCL (S108). When the combustion variation ΔCC exceeds the permissible limit ΔCCL, the spike base air-fuel ratio AFbs is increased (S213). When the torque decrease amount ΔTD is above the permissible value ΔTDL, the spike base air-fuel ratio AFbs is decreased (S215). When the combustion variation ΔCC is above the permissible limit ΔCCL, and the torque decrease amount ΔTD is above the permissible value ΔTDL, the spike base air-fuel ratio AFbs is increased, and a fuel discharge time number EN is increased (S216).

12 Claims, 5 Drawing Sheets

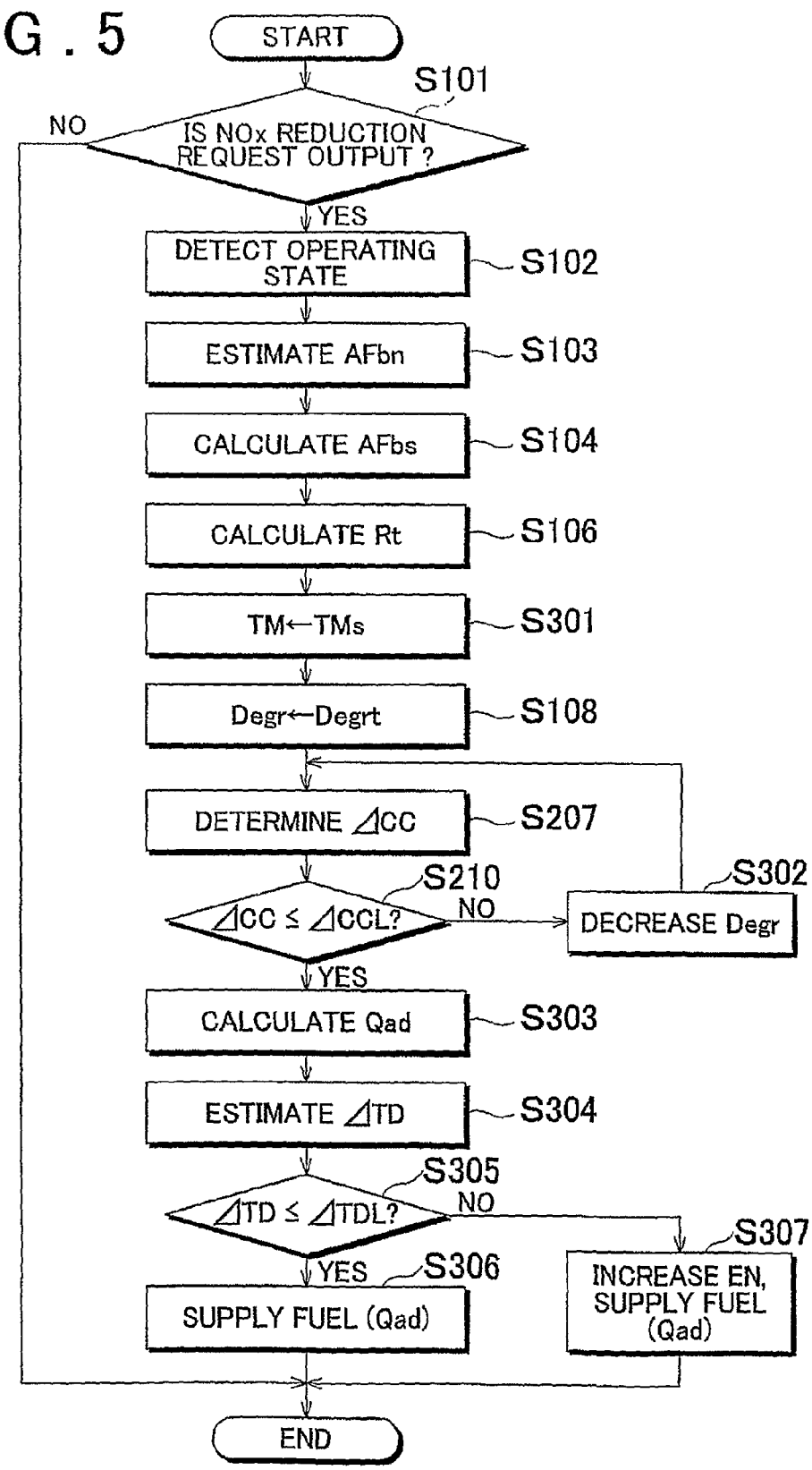

EXHAUST GAS PURIFICATION SYSTEM FOR INTERNAL COMBUSTION ENGINE AND CONTROL METHOD FOR SAME

BACKGROUND OF THE INVENTION

1. Field of the Invention

The invention relates to an exhaust gas purification system for an internal combustion engine, which includes an exhaust gas recirculation apparatus, and a control method for the same.

2. Description of the Related Art

An exhaust gas purification system that includes an exhaust gas recirculation apparatus (hereinafter, referred to as "EGR apparatus") and a NOx storage reduction catalyst (hereinafter, may be simply referred to as "NOx catalyst") is available as a technology for decreasing the amount of nitrogen oxide (NOx) discharged from an internal combustion engine into the atmosphere.

The EGR apparatus decreases the amount of NOx generated in the internal combustion engine, by introducing part of exhaust gas into an intake system for the internal combustion engine, thereby decreasing the combustion temperature of air-fuel mixture in a combustion chamber.

When the concentration of oxygen in exhaust gas that flows into the NOx catalyst is high, the NOx catalyst stores (absorbs, adsorbs) NOx in the exhaust gas. When the concentration of oxygen in the exhaust gas that flows into the NOx catalyst decreases, and a reducing agent is present, the NOx catalyst reduces stored NOx. When the amount of NOx stored in the NOx catalyst increases, purification performance of the NOx catalyst decreases. Therefore, a rich spike control is executed. The rich spike control reduces NOx stored in the NOx catalyst by supplying a reducing agent (for example, fuel) from a reducing agent supply valve provided upstream of the NOx catalyst into the exhaust gas to temporarily decrease the air-fuel ratio of the exhaust gas that flows into the NOx catalyst.

It is required to dispose the NOx catalyst close to the internal combustion engine to suppress a decrease in the temperature of the NOx catalyst. Japanese Patent Application Publication No. 2000-8835 (JP-A-2000-8835) describes an exhaust gas purification system that includes an EGR apparatus that recirculates part of exhaust gas passing through a portion of an exhaust passage, which is located downstream of a NOx catalyst, to an intake system.

However, if the rich spike control for the NOx catalyst is executed when the exhaust gas is recirculated, a large amount of the reducing agent that has flown out of the NOx catalyst may flowing into the intake system for the internal combustion engine. As a result, torque may be sharply decreased (i.e., a so-called torque shock may occur) due to deterioration of the combustion state of air-fuel mixture, which may result in deterioration of drivability.

SUMMARY OF THE INVENTION

The invention provides an exhaust gas purification system for an internal combustion engine, which includes an EGR apparatus that recirculates part of exhaust gas, which contains a reducing agent supplied to a NOx storage reduction catalyst provided in an exhaust passage, to an internal combustion engine, and a control method for the same, wherein when the EGR apparatus recirculates the exhaust gas, and a rich spike control is executed, a sharp decrease in torque is suppressed as much as possible in the internal combustion engine.

A first aspect of the invention relates to an exhaust gas purification system for an internal combustion engine. The exhaust gas purification system includes: a NOx storage reduction catalyst provided in an exhaust passage for the internal combustion engine; reducing agent supply means for supplying a reducing agent to the NOx storage reduction catalyst from a position upstream of the NOx storage reduction catalyst; an EGR apparatus that recirculates part of exhaust gas containing the reducing agent to the internal combustion engine; rich spike control means for executing a rich spike control that recovers exhaust gas purification performance of the NOx storage reduction catalyst, by controlling the reducing agent supply means so that the reducing agent supply means supplies the reducing agent to temporarily decrease an air-fuel ratio of the exhaust gas that flows into the NOx storage reduction catalyst to a predetermined target inflow air-fuel ratio; and base air-fuel ratio control means for decreasing a base air-fuel ratio in the internal combustion engine to a predetermined spike base air-fuel ratio, when the EGR apparatus recirculates the exhaust gas, and the rich spike control is executed, wherein the predetermined spike base air-fuel ratio is lower than the base air-fuel ratio when the rich spike control is not executed.

In the exhaust gas purification system with the above-described configuration, the reducing agent supply means supplies the reducing agent (for example, fuel) in an amount required to decrease the air-fuel ratio of the exhaust gas that flows into the NOx storage reduction catalyst to the predetermined target inflow air-fuel ratio. The predetermined target inflow air-fuel ratio is the target value of the air-fuel ratio of the exhaust gas that flows into the NOx storage reduction catalyst when the exhaust gas purification performance of the NOx storage reduction catalyst is recovered. More specifically, the predetermined target inflow air-fuel ratio is an air-fuel ratio appropriate for reducing NOx or SOx stored in the NOx storage reduction catalyst. For example, the predetermined target inflow air-fuel ratio may be the substantially stoichiometric air-fuel ratio or a rich air-fuel ratio.

When the EGR apparatus recirculates the exhaust gas, and the rich spike control is executed around the same time, the EGR apparatus recirculates part of the exhaust gas containing the reducing agent to the internal combustion engine. That is, the EGR gas, whose air-fuel ratio has been excessively decreased, is recirculated to the internal combustion engine. As a result, oxygen is insufficient in portions of air-fuel mixture in a combustion chamber of the internal combustion engine. Accordingly, each time the rich spike control is executed, a sharp combustion variation is caused, which may result in a misfire or a sharp decrease in torque in the internal combustion engine.

According to the first aspect, when the EGR apparatus recirculates the exhaust gas, and the rich spike control is executed, the base air-fuel ratio in the internal combustion engine is decreased to the spike base air-fuel ratio. The spike base air-fuel ratio is lower than the base air-fuel ratio when the rich spike control is not executed. "The base air-fuel ratio" in the first aspect is a ratio of an amount of the fuel supplied to the internal combustion engine, to an amount of air taken into the internal combustion engine (that is, the air-fuel ratio of air-fuel mixture).

"The base air-fuel ratio when the rich spike control is not executed" may be a base air-fuel ratio appropriate for the operating state of the internal combustion engine when the rich spike control is not executed (for example, a base air-fuel ratio appropriate for generating required engine torque). The base air-fuel ratio when the rich spike control is not executed (hereinafter, may be referred to as "during normal operation")

is referred to as "normal operation base air-fuel ratio" for the sake of convenience. "The spike base air-fuel ratio" is the target value of the base air-fuel ratio when the rich spike control is executed. The spike base air-fuel ratio may be higher (leaner) than the target inflow air-fuel ratio, or may be substantially equal to the target inflow air-fuel ratio, as long as the spike base air-fuel ratio is lower than the normal operation base air-fuel ratio.

According to the first aspect, it is possible to decrease the amount of the reducing agent required to be supplied to decrease the air-fuel ratio of the exhaust gas that flows into the NOx storage reduction catalyst to the target inflow air-fuel ratio, because the air-fuel ratio of the exhaust gas discharged from the internal combustion engine is made lower (richer) than the air-fuel ratio of the exhaust gas during normal operation, in advance. Accordingly, it is possible to appropriately decrease the amount of the reducing agent that is contained in the EGR gas and recirculated to the internal combustion engine.

According to the first aspect, when the EGR gas containing the reducing agent is recirculated, the base air-fuel ratio has been decreased to the spike base air-fuel ratio that is lower than the normal operation base air-fuel ratio. Therefore, it is possible to appropriately decrease the variation in the base air-fuel ratio caused by recirculating the EGR gas whose air-fuel ratio has been excessively decreased. Accordingly, it is possible to decrease the combustion variation caused in the internal combustion engine, and to suppress a misfire or a sharp decrease in the torque in the internal combustion engine. Also, drivability is improved. Further, it is possible to decrease the amount of the reducing agent supplied by the reducing agent supply means controlled by the rich spike control means. Therefore, for example, when fuel is supplied as the reducing agent, fuel efficiency is improved.

In the first aspect, the reducing agent supply means may include a reducing agent supply valve provided in the exhaust passage at a position upstream of the NOx storage reduction catalyst. The reducing agent supply means may supply the reducing agent to the NOx storage reduction catalyst by making the reducing agent supply valve supply the reducing agent. Also, the reducing agent supply means may supply the reducing agent to the storage reducing NOx catalyst by making a fuel injection valve perform sub-injection, i.e., by making the fuel injection valve inject the fuel that serves as the reducing agent at a timing different from a timing at which the fuel injection valve performs main injection. For example, the reducing agent supply means may supply the reducing agent to the NOx storage reduction catalyst by making the fuel injection valve perform post-injection during an expansion stroke or an exhaust stroke of the internal combustion engine.

In the first aspect, the EGR apparatus may recirculate the exhaust gas that has not flown into the NOx storage reduction catalyst, or the exhaust gas that has flown out from the NOx storage reduction catalyst, as long as the EGR apparatus recirculates part of the exhaust gas containing the reducing agent.

In the first aspect, the base air-fuel ratio control means may decrease the base air-fuel ratio to the spike base air-fuel ratio by controlling the EGR apparatus so that the amount of the EGR gas is increased. Alternatively, the base air-fuel ratio control may decrease the base air-fuel ratio to the spike base air-fuel ratio by decreasing the amount of new air taken into the internal combustion engine. For example, the amount of the new air may be decreased by decreasing the opening degree of a throttle valve of the internal combustion engine. According to the above-described control, the amount of the fuel supplied to the internal combustion engine is not increased. Therefore, deterioration of fuel efficiency is suppressed, which is desirable.

In the first aspect, the rich spike control means may decrease an amount of the supplied reducing agent with a decrease in a difference between the spike base air-fuel ratio and the target inflow air-fuel ratio. That is, when values of the target inflow air-fuel ratio in the rich spike controls are uniform, the amount of the supplied reducing agent may be decreased as the degree of the decrease in the base air-fuel ratio is increased. Thus, it is possible to reduce the possibility that the reducing agent supply means supplies an extremely large amount of the reducing agent to the NOx storage reduction catalyst. This saves the reducing agent.

If the base air-fuel ratio means excessively decreases the base air-fuel ratio, that is, if the spike base air-fuel ratio is extremely low as compared to the normal operation base air-fuel ratio, a combustion state may be unstable due to the change in the base air-fuel ratio, because the combustion variation is increased in each combustion cycle of the internal combustion engine. The combustion variation is a concept that includes, for example, a decrease in the torque in the internal combustion engine, a misfire, an increase in smoke discharged from the internal combustion engine, and combustion noise.

It is preferable that the combustion variation caused by decreasing the base air-fuel ratio should be as small as possible. Accordingly, in the first aspect, the base air-fuel ratio control means may set the spike base air-fuel ratio in a range where a combustion variation, which is caused when the base air-fuel ratio control means decreases the base air-fuel ratio, does not exceed a predetermined permissible limit. Thus, it is possible to suppress an excessive increase in the combustion variation caused when the base air-fuel ratio control means decreases the base air-fuel ratio.

"The permissible limit" signifies the upper limit on the degree or magnitude of the combustion variation permitted in the internal combustion engine. The relation among the normal operation base air-fuel ratio, the spike base air-fuel ratio, and the combustion variation in each operating state of the internal combustion engine may be empirically determined in advance. A control map for the spike base air-fuel ratio may be made using an engine load and an engine speed as parameters. Thus, it is possible to appropriately set the spike base air-fuel ratio in the range where the combustion variation caused by decreasing the base air-fuel ratio does not exceed the permissible limit.

According, to the above-described control, the spike base air-fuel ratio is set with some flexibility as long as the combustion variation does not exceed the permissible limit. For example, it is preferable to set the spike base air-fuel ratio to the lowest possible value to minimize the decrease in the torque caused when the EGR apparatus recirculates the exhaust gas containing the reducing agent to the internal combustion engine. In this case, the spike base air-fuel ratio may be set so that the combustion variation is close to the permissible limit. Alternatively, the spike base air-fuel ratio may be set so that the combustion variation is lower than the permissible limit by a certain amount.

In the first aspect, the exhaust gas purification system may further include combustion variation determination means for determining the combustion variation caused when the base air-fuel ratio control means decreases the base air-fuel ratio; and torque decrease amount determination means for determining a torque decrease amount by which torque is decreased when the EGR apparatus recirculates the exhaust gas containing the reducing agent to the internal combustion engine. The term "determining" may include "estimating" and "detecting".

The base air-fuel ratio control means may set the spike base air-fuel ratio so that the combustion variation is equal to or below a predetermined permissible limit, and the torque decrease amount is equal to or below a predetermined permissible value. "The predetermined permissible value" of the torque decrease amount is the upper limit value of the torque decrease amount permitted in the internal combustion engine, and may be empirically set in advance. Also, the permissible value may be set taking into account whether a driver feels a so-called torque shock.

For example, the base air-fuel ratio control means may increase the spike base air-fuel ratio, when the combustion variation exceeds the permissible limit, and the torque decrease amount is equal to or below the permissible value. Thus, it is possible to suppress the variation in the air-fuel ratio when the base air-fuel ratio control means decreases the base air-fuel ratio during the rich spike control. Accordingly, it is possible to more appropriately decrease the combustion variation caused by decreasing the base air-fuel ratio so that the combustion variation is equal to or below the permissible limit.

The control that increases the spike base air-fuel ratio may be executed in the case where the base air-fuel ratio is decreased to the spike base air-fuel ratio set so that the combustion variation is substantially equal to the permissible limit. This is because the combustion variation may exceed the permissible limit for example, when the operating state of the internal combustion engine is suddenly changed during the rich spike.

The base air-fuel ratio control means may decrease the spike base air-fuel ratio, when the torque decrease amount is above the permissible value, and the combustion variation is equal to or below the permissible limit. Thus, it is possible to further decrease the amount of the reducing agent supplied by the reducing agent supply means controlled by the rich spike control means. In this case, the difference between the spike base air-fuel ratio and the target inflow air-fuel ratio is decreased, and therefore, the variation in the base air-fuel ratio is appropriately decreased. Accordingly, it is possible to accurately decrease the torque decrease amount caused when the EGR apparatus recirculates the exhaust gas containing the reducing agent to the internal combustion engine so that the torque decrease amount is equal to or below the permissible value.

When the combustion variation is above the permissible limit, and the torque decrease amount is above the permissible value, both of the combustion variation and the torque decrease amount may not be decreased by simply increasing or decreasing the spike base air-fuel ratio for the following reason. If the spike base air-fuel ratio is increased to decrease the combustion variation, the torque decrease amount is increased.

If the spike base air-fuel ratio is decreased to decrease the torque decrease amount, the combustion variation is increased.

In this case, the rich spike control means may control the reducing agent supply means so that the reducing agent supply means supplies the reducing agent by performing a reducing agent discharging operation one time or a plurality of times, when the rich spike control is executed one time. The rich spike control means may increase the number of times that the reducing agent supply means performs the reducing agent discharging operation, and the base air-fuel ratio control means may increase the spike base air-fuel ratio.

When the number of times that the reducing agent supply means performs the reducing agent discharging operation is increased, the average value of the amount of the reducing agent supplied by performing the reducing agent discharging operation each time is decreased, as compared to that before increasing the number of times that the reducing agent supply means performs the reducing agent discharging operation. Thus, by decreasing the torque a plurality of times, or increasing the number of times that the torque is decreased, it is possible to decrease each torque decrease amount (i.e., the torque decrease amount by which the torque is decreased each time). By adjusting the number of times that the reducing agent supply means performs the reducing agent discharging operation, each torque decrease amount is accurately decreased to be equal to or below the permissible value.

Also, because each torque decrease amount is decreased in the above-described manner, it is possible to increase the spike base air-fuel ratio. This decreases the combustion variation caused by decreasing the base air-fuel ratio to the spike base air-fuel ratio.

According to the first aspect, by adjusting a value by which the number of times that the reducing agent discharging operation is performed is increased, and by adjusting a correction amount by which the spike base air-fuel ratio is increased, it is possible to suppress the combustion variation so that the combustion variation is equal to or below the permissible limit, and to decrease the torque decrease amount so that the torque decrease amount is equal to or below the permissible value.

The amount of the reducing agent supplied by performing the reducing agent discharging operation each time may be uniform or may not be uniform. According to the first aspect, the total amount of the reducing agent supplied to the NOx storage reduction catalyst when the rich spike control is executed one time is not decreased. Therefore, it is possible to suppress excessive deterioration of efficiency of recovering the exhaust gas purification performance of the NOx storage reduction catalyst.

In the first aspect, the base air-fuel ratio control means may include combustion variation suppression means for decreasing the combustion variation caused when the base air-fuel ratio control means decreases the base air-fuel ratio. Thus, even when the base air-fuel ratio control means decreases the base air-fuel ratio, it is possible to decrease or suppress the combustion variation. Accordingly, it is possible to decrease the spike base air-fuel ratio, thereby appropriately decreasing the decrease in the torque caused in the internal combustion engine.

For example, the combustion variation suppression means may include: a swirl control valve whose opening degree is controlled to generate a swirl of air-fuel mixture in the internal combustion engine; and swirl strength increase means for increasing strength of the swirl by decreasing the opening degree of the swirl control valve when the base air-fuel ratio control means decreases the base air-fuel ratio. Thus, it is possible to increase the strength of the swirl of the air-fuel mixture, thereby appropriately agitating the air-fuel mixture. As a result, the combustion state of the air-fuel mixture is stabilized, and the combustion variation is suppressed.

In the first aspect, the combustion variation suppression means may include main injection timing advancing means for advancing a main injection timing at which main injection is performed, when the base air-fuel ratio control means decreases the base air-fuel ratio. The main injection is fuel injection into a cylinder performed at a timing near a top dead center (TDC) during the compression stroke to provide required engine torque. By advancing the main injection timing, a range of the air-fuel ratio, in which a misfire does not occur, is increased. This appropriately suppresses the combustion variation.

In the first aspect, the combustion variation suppression means may include: pilot injection means for injecting a smaller amount of the fuel than an amount of the fuel injected in main injection, before the main injection is performed; and pilot injection increase means for increasing the amount of the fuel injected from the pilot injection means (i.e., a pilot injection amount), when the base air-fuel control means decreases the base air-fuel ratio.

When the fuel injected in the pilot injection is burned during the compression stroke, the temperature in the combustion chamber and the in-cylinder pressure are increased before the main injection is performed, and a flame kernel is generated. Because the pilot injection increase means increases the pilot injection amount, it is possible to increase the ignition stability when the main injection is performed after the pilot injection is performed. Thus, it is possible to promote the combustion of the air-fuel mixture, thereby improving the combustion state.

In the first aspect, in the exhaust gas purification system for the internal combustion engine, which includes the EGR apparatus that recirculates part of the exhaust gas, which contains the reducing agent supplied to the NOx storage reduction catalyst provided in the exhaust passage, to the internal combustion engine, it is possible to minimize the possibility that the torque is sharply decreased in the internal combustion engine, when the EGR apparatus recirculates the exhaust gas, and the rich spike control is executed.

A second aspect of the invention relates to a control method for an exhaust purification system for an internal combustion engine, which includes a NOx storage reduction catalyst provided in an exhaust passage for the internal combustion engine; reducing agent supply means for supplying a reducing agent to the NOx storage reduction catalyst from a position upstream of the NOx storage reduction catalyst; an EGR apparatus that recirculates part of exhaust gas containing the reducing agent to the internal combustion engine; and rich spike control means for executing a rich spike control that recovers exhaust gas purification performance of the NOx storage reduction catalyst, by controlling the reducing agent supply means so that the reducing agent supply means supplies the reducing agent to temporarily decrease an air-fuel ratio of the exhaust gas that flows into the NOx storage reduction catalyst to a predetermined target inflow air-fuel ratio. The control method includes decreasing a base air-fuel ratio in the internal combustion engine to a predetermined spike base air-fuel ratio, when the EGR apparatus recirculates the exhaust gas, and the rich spike control is executed, wherein the predetermined spike base air-fuel ratio is lower than the base air-fuel ratio when the rich spike control is not executed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a flowchart showing a modified torque decrease suppression routine according to the embodiment of the invention.

DETAILED DESCRIPTION OF EMBODIMENTS

Hereinafter, an embodiment of the invention will be described in detail with reference to the drawings. The technical scope of the invention is not limited to, for example, the size, material, and shape of each of constituent elements, and the relative positions of the constituent elements described in the embodiment, unless otherwise specified.

Figure 1:
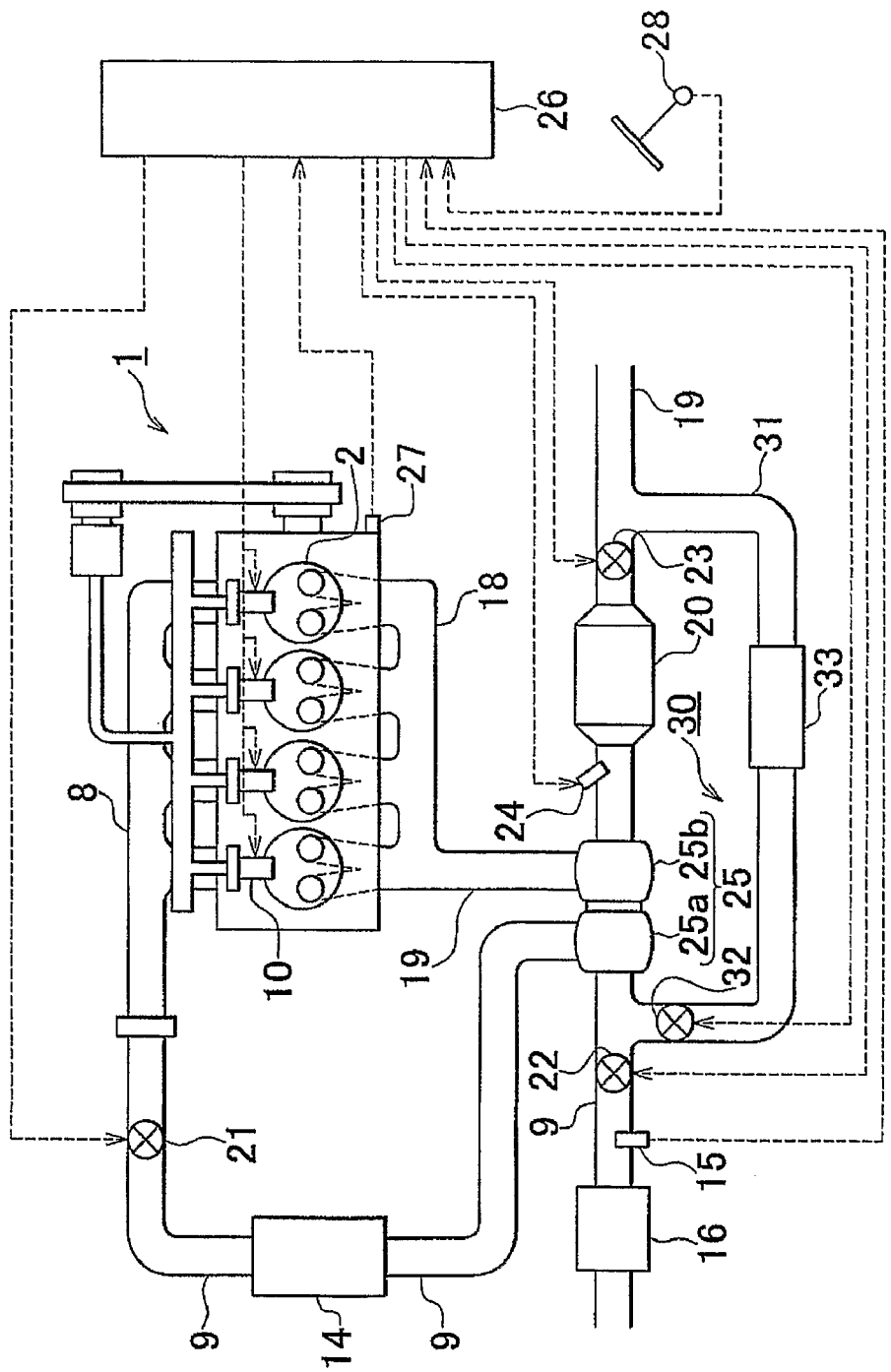
FIG. 1 is a diagram showing the general configuration of an internal combustion engine according to an embodiment of the invention, and intake/exhaust systems and a control system for the internal combustion engine.
Figure 2:
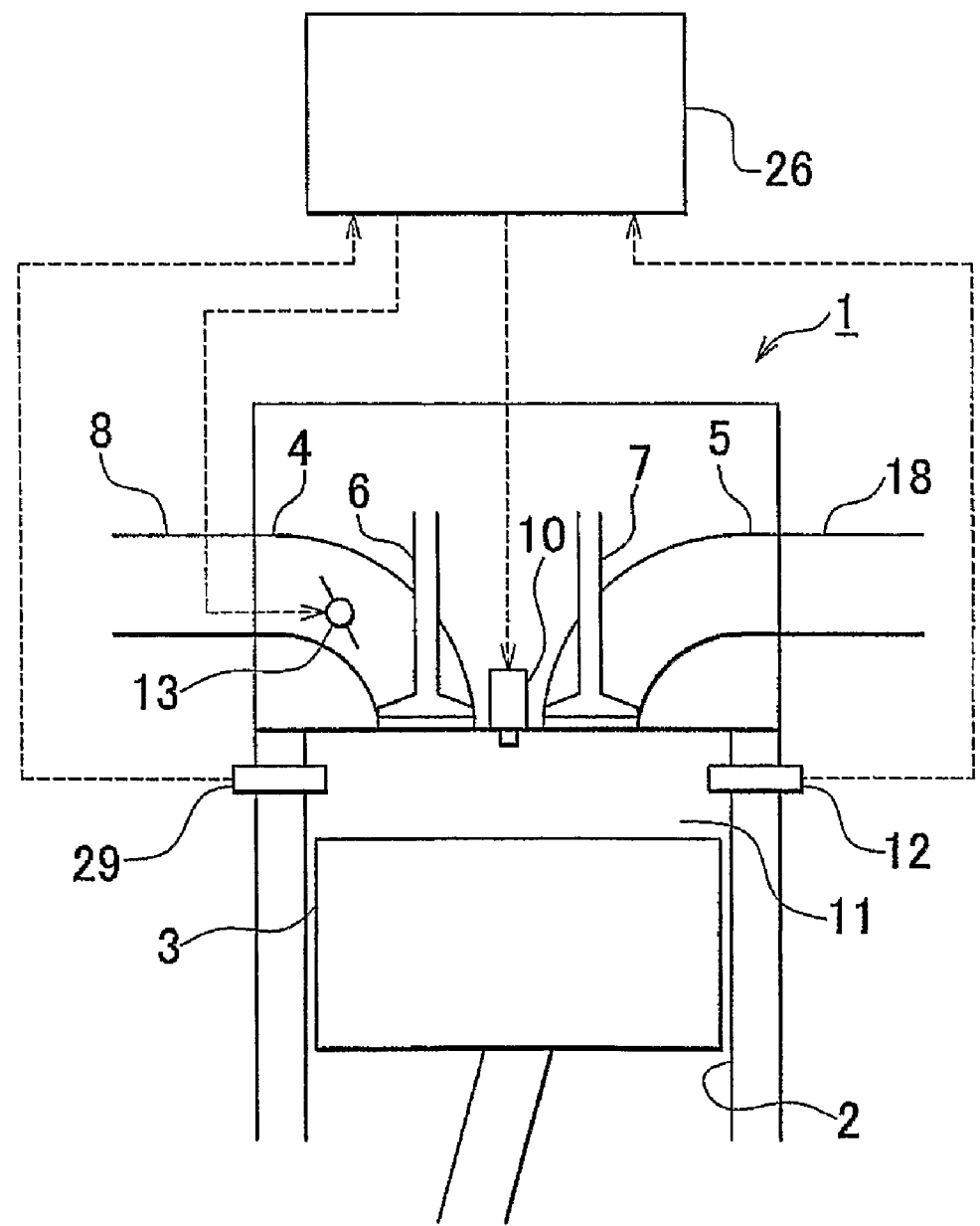
FIG. 2 is a schematic diagram showing a cross section of the internal combustion engine according to the embodiment of the invention, taken along the axis of a cylinder.

FIG. 1 is a diagram showing the general configuration of an internal combustion engine 1 according to the embodiment, and intake/exhaust systems and a control system for the internal combustion engine 1. The internal combustion engine 1 shown in FIG. 1 is a diesel engine that includes four cylinders 2. FIG. 2 is a schematic diagram showing a cross section of the internal combustion engine according to the embodiment, taken along the axis of the cylinder 2.

[Intake system] The internal combustion engine 1 is connected to an intake manifold 8. Each branch pipe of the intake manifold 8 is connected to a combustion chamber of a corresponding cylinder 2 through an intake port. A first intake throttle valve 21 is provided close to a connection portion where the intake manifold 8 is connected to an intake passage 9. The first intake throttle valve 21 adjusts the flow rate of intake air that flows in the intake passage 9. An intercooler 14 is provided in the intake passage 9 at a position upstream of the first intake throttle valve 21. The intercooler 14 cools gas that flows in the intake passage 9.

Further, a compressor housing 25a of a turbocharger 25 is provided in the intake passage 9 at a position upstream of the intercooler 14. The turbocharger 25 is operated using energy of exhaust gas as a driving power source. An airflow meter 15 is disposed upstream of the compressor housing 25a. The airflow meter 15 outputs an electric signal corresponding to the amount of intake air that flows in the intake passage 9. An air cleaner 16 is provided upstream of the airflow meter 15. A second intake throttle valve 22 is provided in the intake passage 9 at a position between the airflow meter 15 and the compressor housing 25a. The second intake throttle valve 22 adjusts the flow rate of intake air that flows in the intake passage 9.

In the intake system for the internal combustion engine 1 with the above-described configuration, after the air cleaner 16 removes dust in the intake air, the intake air flows into the compressor housing 25a through the intake passage 9. After the intake air flows into the compressor housing 25a, the intake air is compressed by the rotation of a compressor wheel (not shown) provided inside the compressor housing 25a. Then, after the temperature of the intake air is increased due to compression, the intake air is cooled by the intercooler 14. Then, the flow rate of the intake air is adjusted by the first intake throttle valve 21 according to need, and then, the intake air flows into the intake manifold 8. After the intake air flows into the intake manifold 8, the intake air is distributed to the cylinders 2 through the intake ports 4.

As shown in FIG. 2, a piston 3 is slidably provided in each cylinder 2 of the internal combustion engine 1. A combustion chamber 11 in an upper portion of the cylinder 2 is connected to an intake port 4 and an exhaust port 5. The cylinder 2 is provided with a combustion pressure sensor 12 that detects a pressure (combustion pressure) in the combustion chamber 11, and an air-fuel ratio sensor 29 that detects an air-fuel ratio of air-fuel mixture. A swirl control valve 13 is provided in the intake port 4. The opening degree of the swirl control valve 13 is controlled to generate a swirl of the air-fuel mixture. By opening/closing the swirl control valve 13, the flow of air from the intake port 4 to the combustion chamber 11 is controlled. An opening portion of the intake port 4, which is open to the combustion chamber 11, is opened/closed by an intake valve 6. An opening portion of the exhaust port 5, which is open to the combustion chamber 11, is opened/closed by an exhaust valve 7.

The intake port 4 and the exhaust port 5 are connected to the intake manifold 8 and the exhaust manifold 18, respectively. A fuel injection valve 10, which injects fuel directly into the combustion chamber 11, is provided in each cylinder 2. The intake air distributed to each cylinder 2 is burned using the fuel injected from the corresponding fuel injection valve 10 as an ignition source.

Referring to FIG. 1 again, the internal combustion engine 1 is connected to the exhaust manifold 18. Each branch pipe of the exhaust manifold 18 is connected to the combustion chamber 11 of the corresponding cylinder 2 through the exhaust port 5. The exhaust manifold 18 is connected to a turbine housing 25b of the turbocharger 25. The turbine housing 25b is connected to an exhaust passage 19. A downstream portion of the exhaust passage 19 is connected to a muffler (not shown).

[Exhaust system] A NOx storage reduction catalyst (hereinafter, referred to as "NOx catalyst") 20 is provided in the exhaust passage 19. A fuel supply valve 24 is provided in the exhaust passage 19 at a position between the NOx catalyst 20 and the turbine housing 25b. The fuel supply valve 24 that is opened according to a command signal from an ECU (Electronic Control Unit) 26 (described later) to supply the fuel, which serves as a reducing agent, into exhaust gas. An exhaust throttle valve 23 is provided in the exhaust passage 19 at a position downstream of the NOx catalyst 20. The exhaust throttle valve 23 adjusts the flow rate of the exhaust gas that flows in the exhaust passage 19.

The fuel supplied from the fuel supply valve 24 into the exhaust gas in the exhaust passage 19 decreases the concentration of oxygen in the exhaust gas. The exhaust gas with a low oxygen concentration, which is generated in the above-described manner, flows into the NOx catalyst 20. As a result, NOx stored in the NOx catalyst 20 is released, and reduced to nitrogen ($N_2$). That is, a NOx reduction process for the NOx catalyst 20 is executed by executing a rich spike control that temporarily decreases the concentration of oxygen in the exhaust gas that flows into the NOx catalyst 20 by supplying the fuel, which serves as the reducing agent, from the fuel supply valve 24. In the embodiment, the fuel supply valve 24 that supplies the fuel, which serves as the reducing agent, into the exhaust gas may be regarded as the reducing agent supply means in the embodiment.

In the exhaust system for the internal combustion engine 1 with the above-described configuration, burned gas in each cylinder 2 of the internal combustion engine 1 is discharged into the exhaust manifold 18 through the exhaust port 5. Then, the exhaust gas flows from the exhaust manifold 18 into the turbine housing 25b of the turbocharger 25. After the exhaust gas flows into the turbine housing 25b, a turbine wheel (not shown), which is rotatably supported in the turbine housing 25b, is rotated using heat energy of the exhaust gas. At this time, rotational torque of the turbine wheel (not shown) is transmitted to the compressor wheel (not shown) of the compressor housing 25a.

After the exhaust gas flows out from the turbine housing 25b, NOx in the exhaust gas is stored in the NOx catalyst 20. Then, the flow rate of the exhaust gas is adjusted by the exhaust throttle valve 23 according to need, and then, the exhaust gas is discharged into the atmosphere through the muffler.

[EGR apparatus] An exhaust gas recirculation apparatus (hereinafter, referred to as "EGR apparatus") 30 is provided for the internal combustion engine 1. The EGR apparatus 30 recirculates part of the exhaust gas that passes through a portion of the exhaust passage 19, which is located downstream of the NOx catalyst 20, to a portion of the intake passage 9, which is located upstream of the compressor housing 25a. The EGR apparatus 30 includes an EGR passage 31 that connects the portion of the exhaust passage 19, which is located downstream of the exhaust throttle valve 23, to the portion of the intake passage 9, which is located upstream of the compressor housing 25a and downstream of the second intake throttle valve 22; an EGR valve 32 that adjusts the flow rate of the exhaust gas that flows in the EGR passage 31 (hereinafter, referred to as "EGR gas"); and an EGR cooler 33 that cools the EGR gas that flows in a portion of the EGR passage 31, which is located upstream of the EGR valve 32.

In the EGR apparatus 30 with the above-described configuration, when the EGR valve 32 is opened, the EGR passage 31 is opened, and part of the exhaust gas that has flown out from the NOx catalyst 20 flows into the intake passage 9 through the EGR passage 31. After the EGR gas flows into the intake passage 9, the EGR gas is recirculated to the combustion chambers 11 of the internal combustion engine 1 through the compressor housing 25a and the intake manifold 8.

The flow rate of the EGR gas (hereinafter, referred to as "EGR gas flow rate") is adjusted by adjusting the opening degree of the second intake throttle valve 22 to increase/decrease the pressure of the intake air at a connection portion of the intake passage 9, which is connected to the EGR passage 31. For example, when the opening degree of the second intake throttle valve 22 is decreased, a negative pressure is generated at the connection portion of the intake passage 9, which is connected to the EGR passage 31, and therefore, the EGR gas flow rate is increased.

The EGR gas contains inert gas components that are not burned, and that have high heat capacities, such as water ($H_2O$) and carbon dioxide ($CO_2$). Therefore, if the air-fuel mixture contains the EGR gas, the combustion temperature of the air-fuel mixture is decreased. This suppresses the generation of NOx in the internal combustion engine 1.

When the EGR gas is cooled in the EGR cooler 33, the temperature of the EGR gas is decreased, and the volume of the gas is decreased. Therefore, when the EGR gas is recirculated into the combustion chamber 11, an atmospheric temperature in the combustion chamber 11 is not unnecessarily increased. In addition, there is no possibility that the amount of new air supplied into the combustion chamber 11 (the volume of new air) is unnecessarily decreased.

The ECU (Electronic Control Unit) 26 is provided for the internal combustion engine 1 with the above-described configuration to control the internal combustion engine 1 and the intake/exhaust systems. The ECU 26 controls, for example, the operating state of the internal combustion engine 1 according to an operating condition under which the internal combustion engine 1 is operated, and a request from a driver.

The ECU 26 is connected, via electric wires, to sensors relating to controls of the operating state of the internal combustion engine 1, such as the airflow meter 15, a crank position sensor 27 that detects an engine speed, an accelerator pedal position sensor 28 that detects an accelerator pedal operation amount, the air-fuel ratio sensor 29, and the combustion pressure sensor 12. Signals output from the sensors are input to the ECU 26. The ECU 26 is connected, via electric wires, to the fuel injection valve 10, the swirl control valve 13, the first intake throttle valve 21, the second intake throttle valve 22, the exhaust throttle valve 23, the fuel supply valve 24, the EGR valve 32, and the like that are controlled by the ECU 26.

For example, when the ECU 26 changes the opening degree of the swirl control valve 13, the strength of the swirl of the air-fuel mixture in the combustion chamber 11 is increased/decreased. The ECU 26 executes controls relating to main injection and pilot injection from the fuel injection valve 10. The main injection is fuel injection performed at a timing near a top dead center (TDC) during the compression stroke of the internal combustion engine 1 to provide engine torque. The pilot injection is performed before the main injection is performed. The amount of the fuel injected in the pilot injection is smaller than the amount of the fuel injected in the main injection. In the embodiment, the ECU 26 controls the amount of the fuel injected in the pilot injection (hereinafter, referred to as "pilot injection amount") and a main injection timing at which the main injection is performed. The controls executed by the ECU 26 will be described in detail later.

The ECU 26 includes a CPU, a ROM, and a RAM. The ROM stores programs used to execute controls for the internal combustion engine 1, and maps that stores data. The programs stored in the ROM of the ECU 26 include routines described later.

[Torque decrease suppression control] The ECU 26 executes a torque decrease suppression control according to the invention, in addition to the rich spike control and controls relating to the EGR apparatus 30. Hereinafter, the controls will be described in detail.

There is an upper limit on the amount of NOx that can be stored in the NOx catalyst 20. Therefore, in the embodiment, when a certain amount of NOx is stored in the NOx catalyst 20, the NOx reduction process is executed by executing the rich spike control. More specifically, the fuel is supplied from the fuel supply valve 24 into the exhaust gas so that the air-fuel ratio of the exhaust gas that flows into the NOx catalyst 20 is temporarily decreased to a rich air-fuel ratio, and NOx stored in the NOx catalyst 20 is appropriately released. The NOx reduction process may be regarded as recovery of exhaust gas purification performance of the NOx storage reduction catalyst according to the invention.

If the rich spike control is executed when the EGR apparatus 30 is recirculating the EGR gas, or recirculates the EGR gas, a large amount of the fuel is supplied from the fuel supply valve 24 into the exhaust gas, and therefore, the air-fuel ratio of the EGR gas is excessively decreased. Also, part of the fuel supplied from the fuel supply valve 24 (hereinafter, referred to as "supplied fuel") passes through the NOx catalyst 20, and then, the part of the supplied fuel is recirculated to the internal combustion engine 1 along with the EGR gas. As a result, each time the rich spike control is executed, a misfire may occur or torque may be sharply decreased (a so-called torque shock may occur) due to a decrease in the concentration of oxygen in portions of the combustion chamber 11.

Accordingly, in the embodiment, when the EGR apparatus 30 recirculates the EGR gas and the rich spike control is executed around the same time, the torque decrease suppression control is executed to suppress a sharp decrease in the torque caused by recirculating the EGR gas with an extremely low air-fuel ratio to the internal combustion engine 1. More specifically, when the rich spike control is executed, a base air-fuel ratio AFb in the internal combustion engine 1 is decreased, in advance, to a spike base air-fuel ratio AFbs that is lower (richer) than a normal operation base air-fuel ratio AFbn.

The normal operation base air-fuel ratio AFbn is an air-fuel ratio that is achieved by injecting the fuel from the fuel injection valve 10 into each combustion chamber 11 before the fuel is supplied from the fuel supply valve 24 into the exhaust gas. The normal operation base air-fuel ratio AFbn is changed according to the operating state of the internal combustion engine 1 to generate the engine torque required of the internal combustion engine 1. The spike base air-fuel ratio AFbs is the target value of the base air-fuel ratio AFb when the rich spike control is executed. In the embodiment, the spike base air-fuel ratio AFbs may be regarded as "the predetermined spike air-fuel ratio that is lower than the base air-fuel ratio when the rich spike control is not executed".

If a variation in the air-fuel ratio is extremely large when the base air-fuel ratio AFb is decreased to the spike base air-fuel ratio AFbs, a combustion state in the internal combustion engine 1 may be unstable, because a combustion variation in each combustion cycle of the internal combustion engine 1 is extremely large. This may result in, for example, a decrease in the torque, a misfire, an increase in smoke, and an increase in combustion noise. Accordingly, in the embodiment, the base air-fuel ratio AFb is decreased in a range where a combustion variation $\Delta CC$ does not exceed a permissible limit $\Delta CCL$. The permissible limit $\Delta CCL$ signifies the upper limit on the combustion variation permitted in the internal combustion engine 1. For example, a variation in an engine speed or a variation in a combustion pressure is used as a parameter indicating the combustion variation $\Delta CC$. In the embodiment, the permissible limit $\Delta CCL$ may be regarded as the predetermined permissible limit according to the embodiment.

In the embodiment, a control is executed to stabilize combustion of air-fuel mixture to suppress the combustion variation $\Delta CC$ caused by decreasing the base air-fuel ratio AFb. This control is referred to as a combustion variation suppression process. More specifically, the combustion variation suppression process in the embodiment increases the strength of the swirl of the air-fuel mixture by decreasing the opening degree of the swirl control valve 13. This suppresses a sharp decrease in the torque caused by recirculating the EGR gas with an extremely low air-fuel ratio, while suppressing the combustion variation $\Delta CC$ caused by decreasing the base air-fuel ratio AFb.

Figure 3:
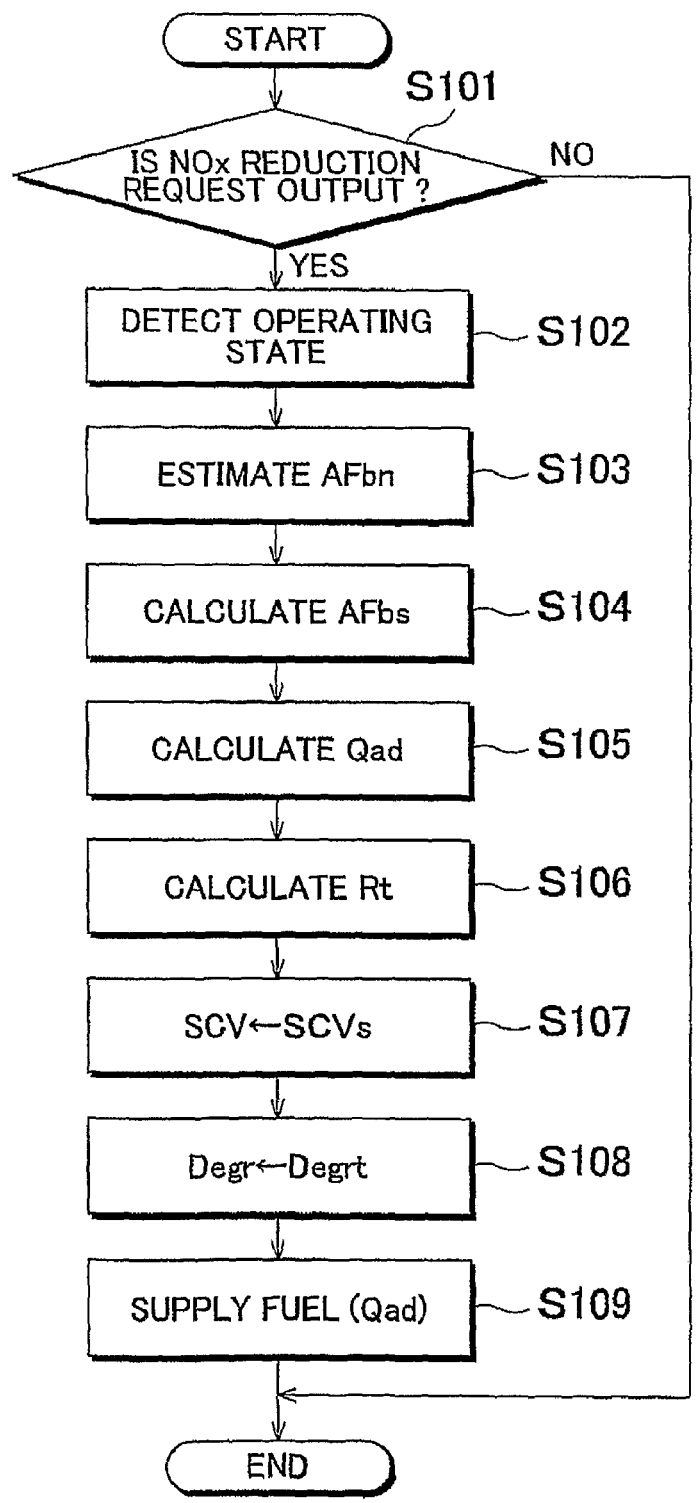
FIG. 3 is flowchart showing a torque decrease suppression basic routine according to the embodiment of the invention.

[Torque decrease suppression basic routine] Hereinafter, the torque decrease suppression control executed by the ECU 26 will be described with reference to a flowchart in FIG. 3. FIG. 3 is the flowchart showing the torque decrease suppression basic routine in the embodiment. This routine is repeatedly executed by the ECU 26 at predetermined intervals. The routine will be described on the assumption that the EGR apparatus 30 is recirculating the exhaust gas. In the embodiment, the ECU 26 that executes the rich spike control may be regarded as the rich spike control means. The ECU 26 that decreases the base air-fuel ratio AFb from the normal operation base air-fuel ratio AFbn to the spike base air-fuel ratio AFbs may be regarded as the base air-fuel ratio control means according to the invention.

First, in step S101, it is determined whether a request for reducing NOx (hereinafter, referred to "NOx reduction request") for the NOx catalyst 20 is output. For example, the NOx reduction request may be output based on a value obtained by accumulating an intake air amount after the immediately preceding NOx reduction process for the NOx catalyst 20 is finished. Also, a NOx sensor (not shown) may be provided in the exhaust passage 19, and the NOx reduction request may be output based on an output from the NOx sensor. When an affirmative determination is made in step S101, the routine proceeds to step S102. When a negative determination is made in step S101, the routine is finished.

In step S102, the ECU 26 detects the operating state of the internal combustion engine 1. More specifically, the ECU 26 calculates an engine speed NE and a fuel injection amount (load) QF based on a crank angle detected by the crank position sensor 27, and the accelerator pedal operation amount detected by the accelerator pedal position sensor 28.

Subsequently, in step S103, the current base air-fuel ratio AFb (the normal operation base air-fuel ratio AFbn) is estimated based on a value detected by the air-fuel ratio sensor 29. The current base air-fuel ratio AFb may be calculated based on the fuel injection amount QF and a value detected by the airflow meter 15 (an intake air amount Ga). After the process in step S103 is finished, the routine proceeds to step S104.

In step S104, the spike base air-fuel ratio AFbs corresponding to the engine speed NE and the fuel injection amount QF is calculated. The relation among the engine speed NE, the fuel injection amount QF, the combustion variation $\Delta CC$, and the spike base air-fuel ratio AFbs in the internal combustion engine 1 is empirically determined in advance, and a control map that shows the relation is stored in the ECU 26. Then, the control map is accessed using the engine speed NE and the fuel injection amount QF as parameters, and the spike base air-fuel ratio AFbs is calculated in the range where the combustion variation $\Delta CC$ does not exceed the permissible limit $\Delta CCL$.

In step S105, an amount Qad of the fuel required to be supplied to decrease the air-fuel ratio of the exhaust gas that flows into the NOx catalyst 20 (hereinafter, referred to as "inflow exhaust air-fuel ratio") AFc to a target inflow exhaust air-fuel ratio AFct is calculated (hereinafter, this amount Qad will be referred to as "rich spike supply amount Qad"). The air-fuel ratio of the exhaust gas discharged from the internal combustion engine 1 is equal to the spike base air-fuel ratio AFbs. The rich spike supply amount Qad, which is the amount of the fuel supplied from the fuel supply valve 24, is decreased as compared to when the base air-fuel ratio AFb is not decreased in advance. In this routine, the rich spike supply amount Qad is decreased with a decrease in the difference between the spike base air-fuel ratio AFbs and the target inflow exhaust air-fuel ratio AFct.

The target inflow exhaust air-fuel ratio AFct is an air-fuel ratio at which NOx stored in the NOx catalyst 20 can be efficiently reduced. In the embodiment, the target inflow exhaust air-fuel ratio is set to be lower (richer) than the stoichiometric air-fuel ratio. Also, in the embodiment, the target inflow exhaust air-fuel ratio AFct may be regarded as the target inflow air-fuel ratio according to the invention.

In step S106, a target EGR rate Rt used to decrease the base air-fuel ratio AFb from the normal operation base air-fuel ratio AFbn to the spike base air-fuel ratio AFbs is calculated. In the embodiment, by increasing the amount of the EGR gas (i.e., by increasing the EGR rate (the amount of the EGR gas/(the amount of the EGR gas+the intake air amount)), the base air-fuel ratio AFb is decreased. As the EGR rate is increased, the proportion of the intake air amount (the amount of new air) to the amount of the air-fuel mixture is decreased, and therefore, the base air-fuel ratio AFb is decreased. The target EGR rate Rt is the target value of the EGR rate.

Subsequently, in step S107, the ECU 26 changes the opening degree of the swirl control valve 13 (hereinafter, referred to as "swirl opening degree") SCV to a spike swirl opening degree SCVs, by outputting a command to the swirl control valve 13. The spike swirl opening degree SCVs is the target value of the swirl opening degree when the rich spike control is executed. The spike swirl opening degree SCVs is smaller than a swirl opening degree during normal operation. The spike swirl opening degree SCVs is empirically set in advance. After the process in step S107 is finished, the routine proceeds to step S108.

In step S108, the ECU 26 increases the opening degree of the EGR valve 32 (hereinafter, referred to as "EGR opening degree") Degr to a target opening degree Degrt so that the EGR rate is equal to the target EGR rate Rt, by outputting a command to the EGR valve 32. The target opening degree Degrt is the target value of the EGR opening degree when the EGR rate is changed to the target EGR rate Rt. The target opening degree Degrt is empirically set in advance. In step S108, the opening degree of the second intake throttle valve 22 may be adjusted according to need.

Subsequently, in step S109, the ECU 26 controls the fuel supply valve 24 by outputting a command to the fuel supply valve 24 so that the fuel supply valve 24 supplies the fuel in the rich-spike supply amount Qad calculated in step S105 to decrease the inflow exhaust air-fuel ratio AFc to the target inflow exhaust air-fuel ratio AFct. Thus, NOx stored in the NOx storage reduction catalyst 20 is reduced. After the process in step S109 is finished, the routine is finished.

According to the routine, the base air-fuel ratio AFb has been decreased to the spike base air-fuel ratio AFbs at a time point at which the EGR gas containing the fuel supplied from the fuel injection valve 24 is recirculated to the internal combustion engine 1. Accordingly, it is possible to decrease the variation in the air-fuel ratio when the EGR gas, whose air-fuel ratio has been decreased to the target inflow exhaust air-fuel ratio AFct, is recirculated to the internal combustion engine 1 (i.e., when the extremely rich EGR gas is recirculated to the internal combustion engine 1). As a result, it is possible to further decrease the above-described sharp decrease in the torque.

The spike swirl opening degree SCVs in the routine may be an opening degree at which the combustion of the air-fuel mixture is promoted as much as possible, and may be changed according to the operating state of the internal combustion engine 1. For example, the spike swirl opening degree SCVs may be set based on the difference between the normal operation base air-fuel ratio AFbn and the spike base air-fuel ratio AFbs. As the difference is increased, the degree of the decrease in the base air-fuel ratio AFb is increased, and therefore, the combustion variation $\Delta CC$ also tends to increase. Accordingly, as the degree of the decrease in the base air-fuel ratio AFb is increased, the spike swirl opening degree SCVs may be decreased. As a result, it is possible to more appropriately suppress the combustion variation $\Delta CC$.

The spike base air-fuel ratio AFbs may be set according to the spike swirl opening degree SCVs. For example, as the spike swirl opening degree SCVs is decreased, the combustion variation is decreased, and therefore, the spike base air-fuel ratio AFbs may be decreased.

In the routine, the control is executed to decrease the swirl opening degree SCV to suppress the combustion variation $\Delta CC$ (i.e., the combustion variation suppression process is executed). However, this combustion variation suppression process is not essential for applying the invention. In the case where the combustion variation suppression process is not executed, as the spike base air-fuel ratio AFbs is decreased, the combustion variation ΔCC tends to increase. In this case as well, the spike base air-fuel ratio AFbs is set in the range where the combustion variation ΔCC does not exceed the ΔCCL.

[Feedback control] Next, a torque decrease suppression control in the embodiment, which differs from the above-described torque decrease suppression basic routine, will be described. In the torque decrease suppression control described below, a feedback control of the spike base air-fuel ratio AFbs is executed based on the combustion variation ΔCC caused by decreasing the base air-fuel ratio AFb to the spike base air-fuel ratio AFbs, and a torque decrease amount ΔTD by which the torque is decreased when the EGR apparatus 30 recirculates the exhaust gas containing the supplied fuel to the internal combustion engine 1.

More specifically, when the combustion variation ΔCC exceeds the permissible limit ΔCCL, the ECU 26 increases the spike base air-fuel ratio AFbs. As a result, it is possible to decrease the variation in the air-fuel ratio when the base air-fuel ratio AFb is decreased, thereby suppressing the combustion variation ΔCC. In the control, as the parameter indicating the combustion variation ΔCC, the variation ΔNE in the engine speed NE (for example, a variation ΔNE in a phase of an engine speed pulse signal output at intervals of a predetermined crank angle) is used. This variation ΔNE in the phase of the engine speed pulse signal output at intervals of the predetermined crank angle (hereinafter, simply referred to as "phase variation ΔNE") indicates the combustion variation. When the phase variation ΔNE is larger than a permissible value ΔNEL that is empirically set in advance, it is determined that "the combustion variation ΔCC exceeds the permissible limit ΔCCL."

In the feedback control, when the torque decrease amount ΔTD is larger than a permissible value ΔTDL, the ECU 26 decreases the spike base air-fuel ratio AFbs. "The permissible value ΔTDL" is the upper limit value of the torque decrease amount permitted in the internal combustion engine 1. The permissible value ΔTDL is the upper threshold of the torque decrease amount, at and below which a driver does not feel a torque shock. The permissible value ΔTDL is empirically set in advance. In the embodiment, the permissible value ΔTDL may be regarded as the predetermined permissible value according to the invention.

As described above, when the spike base air-fuel ratio AFbs is decreased, it is possible to decrease the variation in the air-fuel ratio caused when the EGR gas, whose air-fuel ratio has been decreased to the target inflow exhaust air-fuel ratio AFct, is recirculated. This decreases the torque decrease amount ΔTD. In the control, as the parameter indicating the torque decrease amount ΔTD, a combustion pressure decrease amount ΔPC, by which the combustion pressure in the internal combustion engine 1 is decreased, is used. When the combustion pressure decrease amount ΔPC is larger than a permissible value ΔPCL that is empirically set in advance, it is determined that "the torque decrease amount ΔTD is larger than the permissible value ΔTDL".

When the combustion variation ΔCC exceeds the permissible limit ΔCCL, and the torque decrease amount ΔTD is larger than the permissible value ΔTDL, the ECU 26 increases a fuel discharge time number EN when the ECU 26 controls the fuel supply valve 24 so that the fuel supply valve 24 supplies the fuel in the rich spike supply amount Qad. In addition, the ECU 26 increases the spike base air-fuel ratio AFbs. The fuel discharge time number EN is the number of times that the fuel supply valve 24 performs a discharging operation when the fuel supply valve 24 supplies the fuel in the rich spike supply amount Qad by performing the discharging operation a plurality of times. By increasing the fuel discharge time number EN, the torque is decreased a plurality of times when recirculating the exhaust gas containing the supplied fuel. Also, as the fuel discharge time number EN is increased, the amount of the fuel supplied by performing the discharging operation one time is decreased. Thus, the torque is decreased a plurality of times. This decreases each torque decrease amount ΔTDL (i.e., the torque decrease amount ΔTDL by which the torque is decreased each time). Further, because the spike base air-fuel ratio AFbs is increased, the combustion variation ΔCC is suppressed. That is, it is possible to decrease the combustion variation ΔCC and to decrease the torque decrease amount ΔTD.

The combustion variation suppression process in the feedback control increases a pilot injection amount QFp, which is the amount of the fuel injected from the fuel injection valve 10 controlled by the ECU 26 in the pilot injection. This increases an in-cylinder temperature in the combustion chamber 11 and an in-cylinder pressure before the main injection is performed. Thus, ignition stability in the main injection is improved. Thus, it is possible to appropriately suppress the combustion variation ΔCC by promoting the combustion of the air-fuel mixture.

Figure 4:
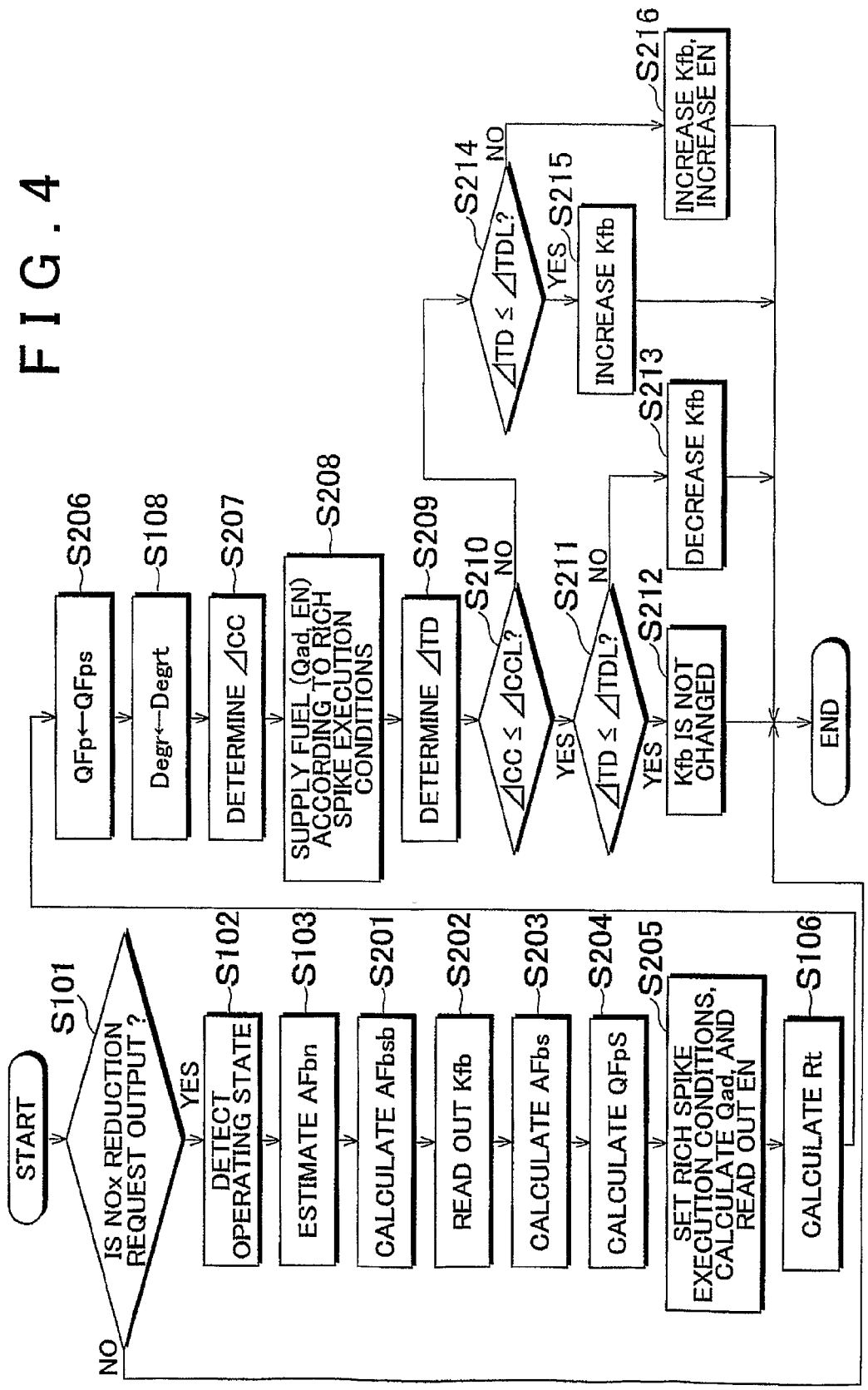
FIG. 4 is a flowchart showing a base air-fuel ratio feedback control routine according to the embodiment of the invention.

[Base air-fuel ratio feedback control routine] Hereinafter, a feedback control of the spike base air-fuel ratio AFbs executed by the ECU 26 will be described with reference to a flowchart in FIG. 4. FIG. 4 is the flowchart showing the base air-fuel ratio feedback control routine in the embodiment. This routine is repeatedly executed by the ECU 26 at predetermined intervals. This routine will be also described on the assumption that the EGR apparatus 30 is recirculating the exhaust gas. In this routine, the same processes as those in the above-described torque decrease suppression basic routine are denoted by the same step numbers, and the detailed description thereof will be omitted.

First, the processes in step S101 to step S103 are the same as those in the torque decrease suppression basic routine. When the process in step S103 is finished, the routine proceeds to step S201. In step S201, a pre-correction spike base air-fuel ratio AFbsb corresponding to the engine speed NE and the fuel injection amount QF is calculated. The pre-correction spike base air-fuel ratio AFbsb is the target value of the base air-fuel ratio AFb when a correction coefficient Kfb (described later) is not taken into account.

Subsequently, in step S202, the ECU 26 reads out the correction coefficient Kfb stored in the immediately preceding routine. The correction coefficient Kfb is a correction coefficient used to correct the basic spike base air-fuel ratio (the pre-correction spike base air-fuel ratio) AFbsb. More specifically, the correction coefficient Kfb is set based on the combustion variation ΔCC and the torque decrease amount ΔTD.

Subsequently, in step S203, the ECU 26 calculates the spike base air-fuel ratio AFbs by multiplying the pre-correction spike base air-fuel ratio AFbsb by the correction coefficient Kfb. After the process in step S203 is finished, the routine proceeds to step S204.

In step S204, the ECU 26 calculates a spike pilot injection amount QFps based on the fuel injection amount QF and the spike base air-fuel ratio AFbs. The spike pilot injection amount QFps is the target value of the pilot injection amount QFp when the rich spike control is executed. The spike pilot injection amount QFps is larger than a pilot injection amount QFpb during normal operation. As the spike base air-fuel ratio AFbs is decreased (i.e., as the spike base air-fuel ratio AFbs becomes richer), the combustion variation ΔCC tends to increase. Therefore, in the routine, as the spike base air-fuel ratio AFbs is decreased, the spike pilot injection amount QFps is increased. After the process in step S204 is finished, the routine proceeds to step S205.

In step S205, the ECU 26 sets conditions that should be satisfied when the rich spike (RS) is executed (hereinafter, referred to as "rich spike execution conditions"). More specifically, as in step S105 in the torque decrease suppression basic routine, first, the rich spike supply amount Qad is calculated based on the spike base air-fuel ratio AFbs and the target inflow exhaust air-fuel ratio AFct. Further, in step S205, the ECU 26 reads out the fuel discharge time number EN stored when the ECU 26 executes this routine last time. The fuel discharge time number EN will be described in detail later. After the process in step S205 is finished, the routine proceeds to step S106.

In step S106, the target EGR rate Rt is calculated. After the process in step S106 is finished, the routine proceeds to step S206. In step S206, the ECU 26 increases the pilot injection amount QFp to the spike pilot injection amount QFps set in step S204, by outputting a command to the fuel injection valve 10. After the process in step S206 is finished, the routine proceeds to step S108. In step S108, the ECU 26 increases the EGR opening degree Degr to the target opening degree Degrt so that the EGR rate is equal to the target EGR rate Rt, by outputting a command to the EGR valve 32. As a result, the base air-fuel ratio AFb is decreased to the spike base air-fuel ratio AFbs. At this time, because the pilot injection amount QFb is increased (i.e., the combustion variation suppression process is executed) in step S206, the combustion variation ΔCC is decreased. After the process in step S108 is finished, the routine proceeds to step S207.

In step S207, the ECU 26 determines the combustion variation ΔCC. More specifically, the ECU 26 detects the phase variation ΔNE during a predetermined period after the ECU 26 increases the EGR opening degree Degr to the target opening degree Degrt, based on the values detected by the crank position sensor 27. The predetermined period is a sampling period for detecting the combustion variation. The predetermined period is empirically set in advance. In the routine, the ECU 26 that determines the combustion variation ΔCC may be regarded as the combustion variation determination means according to the invention.

Subsequently, in step S208, the ECU 26 controls the fuel supply valve 24 by outputting a command to the fuel supply valve 24 so that the fuel supply valve 24 supplies the fuel into the exhaust gas according to the rich spike (RS) execution conditions set in step S205. That is, the ECU 26 controls the fuel supply valve 24 so that the fuel supply valve 24 supplies the fuel in the rich spike supply amount Qad by performing the discharging operation a number of times that is equal to the fuel discharge time number EN. As a result, the inflow exhaust air-fuel ratio AFc is decreased to the target inflow exhaust air-fuel ratio AFct, and NOx stored in the NOx storage reduction catalyst 20 is reduced.

Subsequently, in step S209, the ECU 26 determines the torque decrease amount ΔTD by which the torque is decreased due to the recirculation of the EGR gas containing the fuel supplied in step S208. More specifically, the combustion pressure decrease amount ΔPC is detected based on the values detected by the combustion pressure sensor 12. In the routine, the ECU 26 that determines the torque decrease amount ΔTD may be regarded as the torque decrease amount determination means according to the invention.

Subsequently, in step S210, it is determined whether the combustion variation ΔCC determined in step S207 is equal to or below the permissible limit ΔCCL. More specifically, it is determined whether the phase variation (the variation in the phase of the engine speed pulse signal) ΔNE is equal to or below the permissible value ΔNEL. When an affirmative determination is made in step S210, the routine proceeds to step S211. When a negative determination is made in step S210, the routine proceeds to step S214.

In step S211, it is determined whether the torque decrease amount ΔTD determined in step S209 is equal to or below the permissible value ΔTDL. More specifically, it is determined whether the combustion pressure decrease amount ΔPC is equal to or below the permissible value ΔPCL. When an affirmative determination is made in step S211, the routine proceeds to step S212. When a negative determination is made in step S211, the routine proceeds to step S213.

In step S212, because it has been determined that the combustion variation ΔCC is equal to or below the permissible limit ΔCCL, and the torque decrease amount ΔTD is equal to or below the permissible value ΔTDL, it is determined that the spike base air-fuel ratio AFbs does not need to be corrected. Accordingly, the ECU 26 stores the correction coefficient Kfb without correcting the correction coefficient Kfb. Then, this routine is finished.

In step S213, because it has been determined that the combustion variation ΔCC is equal to or below the permissible limit ΔCCL and the torque decrease amount ΔTD is above the permissible value ΔTDL, the combustion variation ΔCC needs to be decreased. Accordingly, the ECU 26 decreases the correction coefficient Kfb so that the spike base air-fuel ratio AFbs is decreased, and stores the decreased correction coefficient Kfb. After the process in step S213 is finished, the routine is finished.

In step S214, it is determined whether the torque decrease amount ΔTD is equal to or below the permissible value ΔTDL as in step S211. When an affirmative determination is made in step S214, the routine proceeds to step S215. When a negative determination is made in step S214, the routine proceeds to step S216.

In step S215, because it has been determined that the torque decrease amount ΔTD is equal to or below the permissible value ΔTDL, and the combustion variation ΔCC is above the permissible limit ΔCCL, the combustion variation ΔCC needs to be decreased. Accordingly, the ECU 26 increases the correction coefficient Kfb so that the spike base air-fuel ratio AFbs is increased, and stores the increased correction coefficient Kfb. After the process in step S215 is finished, the routine is finished.

In step S216, because it has been determined that the combustion variation ΔCC is above the permissible limit ΔCCL, and the torque decrease amount ΔTD is above the permissible value ΔTDL, the combustion variation ΔCC and the torque decrease amount ΔTD need to be decreased. Accordingly, the ECU 26 increases the fuel discharge time number EN. In addition, the ECU 26 increases the correction coefficient Kfb so that the spike base air-fuel ratio AFbs is increased, and stores the increased correction coefficient Kfb. After the process in step S216 is finished, the routine is finished.

As described above, according to the routine, it is possible to appropriately execute the feedback control of the spike base air-fuel ratio AFbs based on the combustion variation ΔCC and the torque decrease amount ΔTD. Thus, it is possible to accurately control the spike base air-fuel ratio AFbs so that the combustion variation ΔCC is equal to or below the permissible limit ΔCCL and the torque decrease amount ΔTD is equal to or below the permissible value ΔTDL.

Also, in the routine, as the parameter indicating the combustion variation ΔCC, the phase variation ΔNE (the variation ΔNE in the phase of the engine speed pulse signal output at intervals of a predetermined crank angle) is used. However, the variation in the combustion pressure may be used. Also, as the parameter indicating the torque decrease amount ΔTD, the combustion pressure decrease amount ΔPC is used. However, the phase variation ΔNE (the variation ΔNE in the phase of the engine speed pulse signal output at intervals of a predetermined crank angle) may be used.

[Modified example of torque decrease suppression control] Next, a modified example of the torque decrease suppression control, which differs from the above-described torque decrease suppression control, will be described. In the modified example, in the combustion variation suppression process, a main injection timing TM at which the fuel injection valve 10 performs the main injection during the rich spike control is advanced with respect to the main injection timing TM during normal operation. By advancing the main injection timing TM, a range of the air-fuel ratio, in which a misfire does not occur, is increased when the base air-fuel ratio AFb is decreased. Therefore, it is possible to appropriately suppress the combustion variation ΔCC.

[Modified torque decrease suppression routine] FIG. 5 is a flowchart showing a modified torque decrease suppression routine according to the embodiment. This routine is repeatedly executed by the ECU 26 at predetermined intervals. The routine will be also described on the assumption that the EGR apparatus 30 is recirculating the exhaust gas. In this routine, the same processes as those in the above-described torque decrease suppression basic routine and the base air-fuel ratio feedback control routine are denoted by the same step numbers, and the detailed description thereof will be omitted.

The processes in step S101 to step S106 are the same as those in the torque decrease suppression basic routine. After the process in step S106 is finished, the routine proceeds to step S301. In step S301, the ECU 26 changes the main injection timing TM to a spike main injection timing TMs, by outputting a command to the fuel injection valve 10. The spike main injection timing TMs is the target timing of the main injection timing during the rich spike control. The spike main injection timing TMs is set to be advanced with respect to the main injection timing TM during normal operation.

After the process in step S301 is finished, the routine proceeds to step S108. That is, the ECU 26 increases the EGR opening degree Degr to the target opening degree Degrt, by outputting a command to the EGR valve 32. After the process in step S108 is finished, the routine proceeds to step S207. That is, the ECU 26 determines the combustion variation ΔCC. After the process in step S207 is finished, the routine proceeds to step S210.

In step S210, it is determined whether the combustion variation ΔCC determined in step S207 is equal to or below the permissible limit ΔCCL. When a negative determination is made in step S210, the routine proceeds to step S302. When an affirmative determination is made in step S210, the routine proceeds to step S303.

In step S302, the EGR opening degree Degr is decreased by a predetermined opening degree so that the spike base air-fuel ratio AFbs is increased. The predetermined opening degree is empirically set in advance. After the process in step S302 is finished, the routine returns to step S207. That is, the EGR rate is decreased, and the spike base air-fuel ratio AFbs is increased, until the combustion variation ΔCC is equal to or below the permissible limit ΔCCL.

In step S303, the ECU 26 calculates the rich spike supply amount Qad. In step S303, the current inflow exhaust air-fuel ratio AFc is estimated based on the current engine speed NE, the current fuel injection amount QF, and the current EGR opening degree Degr, and calculates the rich spike supply amount Qad required to decrease the inflow exhaust air-fuel ratio AFc to the target inflow exhaust air-fuel ratio AFct.

Subsequently, in step S304, the ECU 26 estimates the torque decrease amount ΔTD. For example, the torque decrease amount ΔTD may be estimated based on the engine speed NE, the fuel injection amount QF, the EGR opening degree Degr, and the rich spike supply amount Qad.

Subsequently, in step S305, it is determined whether the torque decrease amount ΔTD estimated in step S304 is equal to or below the permissible value ΔTDL. When an affirmative determination is made in step S305, the routine proceeds to step S306. In step S306, the ECU 26 supplies the fuel in the rich spike supply amount Qad into the exhaust gas, by outputting a command to the fuel supply valve 24. As a result, the inflow exhaust air-fuel ratio AFc is decreased to the target inflow exhaust air-fuel ratio AFct, and NOx stored in the NOx storage reduction catalyst 20 is reduced. After the process in step S306 is finished, the routine is finished.

When a negative determination is made in step S305, it is determined that the torque decrease amount ΔTD needs to be decreased. Therefore, the routine proceeds to step S307. In step S307, the ECU 26 increases the fuel discharge time number EN, and controls the fuel supply valve 24 so that the fuel supply valve 24 supplies the fuel in the rich spike supply amount Qad. Thus, it is possible to decrease the inflow exhaust air-fuel ratio AFc to the target inflow exhaust air-fuel ratio AFct, while appropriately decreasing the torque decrease amount ΔTD. Also, the target value of the fuel discharge time number EN when the fuel discharge time number EN is increased may be set according to, for example, the difference between the torque decrease amount ΔTD and the permissible value ΔTDL. The target value of the fuel discharge time number EN is empirically set in advance. After the process in step S307 is finished, the routine is finished.

As described above, according to the routine, it is possible to appropriately suppress the combustion variation ΔCC so that the combustion variation ΔCC is equal to or below the permissible limit ΔCCL, by controlling the main injection timing TM and the EGR opening degree Degr. Also, it is possible to accurately decrease the torque decrease amount ΔTD so that the torque decrease amount ΔTD is equal to or below the permissible value ΔTDL, by accurately estimating the torque decrease amount ΔTD by which the torque is decreased due to the recirculation of the EGR gas containing the supplied fuel, and increasing the fuel discharge time number EN according to need.

In the routine, the spike main injection timing TMs may be set based on the difference between the normal operation base air-fuel ratio AFbn and the spike base air-fuel ratio AFbs. For example, the spike main injection timing TMs may be advanced with an increase in the difference between the normal operation base air-fuel ratio AFbn and the spike base air-fuel ratio AFbs that is lower than the normal operation base air-fuel ratio AFbn. Thus, it is possible to appropriately suppress the combustion variation ΔCC.

The controls relating to the swirl opening degree SCV, the pilot injection amount QFp, and the main injection timing TM have been described, as the combustion variation suppression process in the embodiment. By using the above-described controls in combination, it is possible to more appropriately suppress the combustion variation.

Also, in the embodiment, the NOx reduction process for the NOx storage reduction catalyst 20 has been described. However, the invention is not limited to the NOx reduction process. For example, the invention may be applied to a SOx poisoning recovery process for the NOx storage reduction catalyst 20, that is, a process executed so that the NOx storage reduction catalyst 20 recovers from SOx poisoning.

In the rich spike control in the embodiment, the fuel supply valve 24 supplies the fuel to decrease the air-fuel ratio of the exhaust gas that flows into the NOx catalyst 20. However, for example, the fuel injection valve 10 may perform post-injection during the expansion stroke or the exhaust stroke after performing the main injection to decrease the air-fuel ratio of the exhaust gas.

Also, in the exhaust gas purification system in the embodiment, the turbocharger 25 is provided, and part of the exhaust gas is recirculated to the portion of the intake passage 9, which is located upstream of the compressor housing 25a. However, part of the exhaust gas may be recirculated to a portion of the intake system, which is located downstream of the compressor housing 25. Naturally, the invention may be applied to an exhaust gas purification system that does not include the turbocharger. Also, the exhaust gas in a portion of the exhaust passage 19, which is located between the fuel supply valve 24 and the NOx catalyst 20, may be recirculated to the intake system through the EGR passage 31. Also, the invention may be applied to an exhaust gas purification system that includes a so-called high-pressure EGR apparatus that recirculates part of the exhaust gas passing through the exhaust manifold 18 to the intake manifold 8, in addition to the EGR apparatus 30.

The invention claimed is:

1. An exhaust gas purification system for an internal combustion engine, comprising:
   a NOx storage reduction catalyst provided in an exhaust passage for the internal combustion engine;
   a reducing agent supply device that supplies a reducing agent to the NOx storage reduction catalyst from a position upstream of the NOx storage reduction catalyst;
   an EGR apparatus that recirculates part of exhaust gas containing the reducing agent to the internal combustion engine, wherein the EGR apparatus includes an EGR passage through which exhaust gas flown out from the NOx storage reduction catalyst flows into an intake passage of the internal combustion engine;
   a rich spike control device that executes a rich spike control that recovers exhaust gas purification performance of the NOx storage reduction catalyst, by controlling the reducing agent supply device so that the reducing agent supply device supplies the reducing agent to temporarily decrease an air-fuel ratio of the exhaust gas that flows into the NOx storage reduction catalyst to a predetermined target inflow air-fuel ratio; and
   a base air-fuel ratio control device that decreases a base air-fuel ratio in the internal combustion engine to a predetermined spike base air-fuel ratio, when the EGR apparatus recirculates the exhaust gas, and the rich spike control is executed, wherein the predetermined spike base air-fuel ratio is lower than the base air-fuel ratio when the rich spike control is not executed and is higher than the predetermined target inflow air-fuel ratio.

2. The exhaust gas purification system according to claim 1, wherein the base air-fuel ratio is a ratio of an amount of the fuel supplied to the internal combustion engine, to an amount of air taken into the internal combustion engine for generating required engine torque.

3. The exhaust gas purification system according to claim 1, wherein the rich spike control device decreases an amount of the supplied reducing agent with a decrease in a difference between the spike base air-fuel ratio and the target inflow air-fuel ratio.

4. The exhaust gas purification system according to claim 1, wherein the base air-fuel ratio control device sets the spike base air-fuel ratio in a range where a combustion variation, which is caused when the base air-fuel ratio control device decreases the base air-fuel ratio, does not exceed a predetermined permissible limit.

5. The exhaust gas purification system according to claim 1, further comprising:
   combustion variation determination device that determines the combustion variation caused when the base air-fuel ratio control device decreases the base air-fuel ratio; and
   torque decrease amount determination device that determines a torque decrease amount by which torque is decreased when the EGR apparatus recirculates the exhaust gas containing the reducing agent to the internal combustion engine, wherein the base air-fuel ratio control device sets the spike base air-fuel ratio so that the combustion variation is equal to or below a predetermined permissible limit, and the torque decrease amount is equal to or below a predetermined permissible value.

6. The exhaust gas purification system according to claim 5, wherein the base air-fuel ratio control device increases the spike base air-fuel ratio, when the combustion variation exceeds the permissible limit, and the torque decrease amount is equal to or below the permissible value.

7. The exhaust gas purification system according to claim 5, wherein the base air-fuel ratio control device decreases the spike base air-fuel ratio, when the torque decrease amount is above the permissible value, and the combustion variation is equal to or below the permissible limit.

8. The exhaust gas purification system according to claim 5, wherein the rich spike control device controls the reducing agent supply device so that the reducing agent supply device supplies the reducing agent by performing a reducing agent discharging operation one time or a plurality of times, when the rich spike control is executed one time; and
   when the combustion variation exceeds the permissible limit, and the torque decrease amount is above the permissible value, the rich spike control device increases a number of times that the reducing agent supply device performs the reducing agent discharging operation, and the base air-fuel ratio control device increases the spike base air-fuel ratio.

9. The exhaust gas purification system according to claim 1, wherein the base air-fuel ratio control device suppresses combustion variation by:
   controlling an opening degree of a swirl control valve to generate a swirl of air-fuel mixture in the internal combustion engine, wherein
   strength of the swirl is increased by decreasing the opening degree of the swirl control valve, when the base air-fuel ratio control device decreases the base air-fuel ratio.

10. The exhaust gas purification system according to claim 1, wherein the base air-fuel ratio control device advances a main injection timing at which main injection is performed, when the base air-fuel ratio control device decreases the base air-fuel ratio.

11. The exhaust gas purification system according to claim 1, wherein the base air-fuel ratio control device
    injects a smaller amount of the fuel than an amount of the fuel injected in main injection, before the main injection is performed; and
    increases the amount of the smaller amount of fuel injected when the base air-fuel ratio control device decreases the base air-fuel ratio.

12. A control method for an exhaust purification system for an internal combustion engine, which includes:

a NOx storage reduction catalyst provided in an exhaust passage for the internal combustion engine;

reducing agent supply device that supplies a reducing agent to the NOx storage reduction catalyst from a position upstream of the NOx storage reduction catalyst;

an EGR apparatus that recirculates part of exhaust gas containing the reducing agent to the internal combustion engine, wherein the EGR apparatus includes an EGR passage through which exhaust gas flown out from the NOx storage reduction catalyst flows into an intake passage of the internal combustion engine; and rich spike control device that executes a rich spike control that recovers exhaust gas purification performance of the NOx storage reduction catalyst, by controlling the reducing agent supply device so that the reducing supply device supplies the reducing agent to temporarily decrease an air-fuel ratio of the exhaust gas that flows into the NOx storage reduction catalyst to a predetermined target inflow air-fuel ratio, the control method comprising:

decreasing a base air-fuel ratio in the internal combustion engine to a predetermined spike base air-fuel ratio, when the EGR apparatus recirculates the exhaust gas, and the rich spike control is executed, wherein the predetermined spike base air-fuel ratio is lower than the base air-fuel ratio when the rich spike control is not executed and is higher than the predetermined target inflow air-fuel ratio.

* * * * *